(12) United States Patent
Khi et al.

(10) Patent No.: US 11,151,259 B2
(45) Date of Patent: Oct. 19, 2021

(54) METHOD AND SYSTEM FOR DATA SECURITY, VALIDATION, VERIFICATION AND PROVENANCE WITHIN INDEPENDENT COMPUTER SYSTEMS AND DIGITAL NETWORKS

(71) Applicant: Zamna Technologies Limited, London (GB)

(72) Inventors: Irra Ariella Khi, London (GB); Aleksandr Gorelik, RishonLeTsiyon (IL); Ilia Batii, London (GB); Ilya Tikhonov, London (GB)

(73) Assignee: Zamna Technologies Limited, London (GB)

( * ) Notice: Subject to any disclaimer, the term of this patent is extended or adjusted under 35 U.S.C. 154(b) by 205 days.

(21) Appl. No.: 16/212,348

(22) Filed: Dec. 6, 2018

(65) Prior Publication Data

US 2019/0171825 A1    Jun. 6, 2019

Related U.S. Application Data

(60) Provisional application No. 62/595,416, filed on Dec. 6, 2017.

(51) Int. Cl.
*G06F 21/60* (2013.01)
*H04L 9/32* (2006.01)
(Continued)

(52) U.S. Cl.
CPC ........ *G06F 21/602* (2013.01); *G06F 21/6245* (2013.01); *G06F 21/6254* (2013.01);
(Continued)

(58) Field of Classification Search
CPC ............... G06F 21/602; G06F 21/6245; G06F 21/6254; G06F 21/64; H04L 9/0643; H04L 9/0861; H04L 9/3257
(Continued)

(56) References Cited

U.S. PATENT DOCUMENTS 7,058,808 B1 *   6/2006   Zolotorev ............. H04L 9/3257
                                                                     713/176
7,068,787 B1     6/2006   Ta et al.
(Continued)

OTHER PUBLICATIONS

Method and System for Managing Personal Information Within Independent Computer Systems and Digital Networks, U.S. Appl. No. 16/869,354, filed May 7, 2020.
(Continued)

*Primary Examiner* — Shewaye Gelagay
*Assistant Examiner* — Moeen Khan
(74) *Attorney, Agent, or Firm* — Goodwin Procter LLP

(57) ABSTRACT

A system and method for reliably and securely recording and storing all attributes of data, such as for the identification and authorization of individual identity as well as attributes relating to it and personal data including but not limited to individual's physical description, bank details, travel history, etc. (the "Personally Identifiable Information "PII"). PII can be difficult to manage in networks where correlation between data sources is required. Thus, in some embodiments, the system combines a distributed database to create a framework for a robust security. The system manages the distributed database to associate transactions, or actions, using data, digital signatures, and/or cryptographic keys, which can be unique to an individual.

14 Claims, 10 Drawing Sheets

(51) Int. Cl.
    *G06F 21/62*     (2013.01)
    *H04L 9/06*      (2006.01)
    *G06F 21/64*     (2013.01)
    *H04L 9/08*      (2006.01)

(52) U.S. Cl.
    CPC ............ *G06F 21/64* (2013.01); *H04L 9/0643* (2013.01); *H04L 9/0861* (2013.01); *H04L 9/3257* (2013.01)

(58) Field of Classification Search
    USPC ........................................................ 713/180
    See application file for complete search history.

(56) References Cited

U.S. PATENT DOCUMENTS

| | | | |
|---|---|---|---|
| 7,653,712 B1* | 1/2010 | Dubrovsky | ......... H04L 41/0853 709/223 |
| 9,069,979 B2 | 6/2015 | Srinivasan et al. | |
| 9,276,942 B2 | 3/2016 | Srinivasan et al. | |
| 9,396,341 B1 | 7/2016 | Chandra et al. | |
| 9,767,299 B2 | 9/2017 | Selgas et al. | |
| 10,025,797 B1 | 7/2018 | Fonss | |
| 10,063,529 B2 | 8/2018 | Milazzo et al. | |
| 10,361,869 B2 | 7/2019 | Gorman | |
| 10,580,100 B2 | 3/2020 | Pierce et al. | |
| 10,621,150 B2 | 4/2020 | Callan et al. | |
| 2003/0177016 A1 | 9/2003 | Lawhorn et al. | |
| 2005/0021431 A1 | 1/2005 | Schnoerer et al. | |
| 2007/0083460 A1 | 4/2007 | Bachenheimer | |
| 2008/0021834 A1 | 1/2008 | Holla et al. | |
| 2008/0294895 A1 | 11/2008 | Bodner et al. | |
| 2010/0215175 A1 | 8/2010 | Newson et al. | |
| 2011/0302634 A1 | 12/2011 | Karaoguz et al. | |
| 2012/0221854 A1* | 8/2012 | Orsini | ................... H04L 9/3226 713/167 |
| 2012/0226792 A1 | 9/2012 | Johnson et al. | |
| 2014/0136832 A1 | 5/2014 | Klum et al. | |
| 2014/0331061 A1 | 11/2014 | Wright et al. | |
| 2014/0351891 A1 | 11/2014 | Grube et al. | |
| 2014/0359282 A1 | 12/2014 | Shikfa et al. | |
| 2015/0269774 A1 | 9/2015 | Lissone | |
| 2015/0371052 A1 | 12/2015 | Lepeshenkov et al. | |
| 2016/0112455 A1 | 4/2016 | Zhou | |
| 2016/0267637 A1 | 9/2016 | Hsiao et al. | |
| 2016/0373419 A1 | 12/2016 | Weigold et al. | |
| 2017/0046698 A1 | 2/2017 | Haldenby et al. | |
| 2017/0075941 A1 | 3/2017 | Finlow-Bates | |
| 2017/0111175 A1 | 4/2017 | Oberhauser et al. | |
| 2017/0116693 A1* | 4/2017 | Rae | ....................... H04L 9/3236 |
| 2017/0161439 A1 | 6/2017 | Raduchel et al. | |
| 2017/0279783 A1 | 9/2017 | Milazzo et al. | |
| 2017/0286717 A1 | 10/2017 | Khi et al. | |
| 2017/0352031 A1 | 12/2017 | Collin | |
| 2018/0300493 A1* | 10/2018 | Li | ........................... H04L 9/085 |
| 2018/0330079 A1 | 11/2018 | Gray | |
| 2019/0050856 A1 | 2/2019 | Vintila | |
| 2019/0066065 A1 | 2/2019 | Wright et al. | |
| 2019/0066228 A1 | 2/2019 | Wright | |
| 2019/0303887 A1 | 10/2019 | Wright et al. | |
| 2020/0295934 A1* | 9/2020 | Diaz Vico | ................. H04L 9/14 |

OTHER PUBLICATIONS

Method and System for Data Security Within Independent Computer Systems and Digital Networks, U.S. Appl. No. 16/031,433, filed Jul. 10, 2018.

Ali, Muneeb, et al., "Blockstack: Design and Implementation of a Global Naming System with Blockchains", DRAFT v4; accepted for publication at 2016 USENIX Annual Technical Conference (USENIX ATC'16) 13 pages.

BCS Identity Assurance Working Group, "Aspects of Identity Yearbook 2015-16, How to recognize a good online identity scheme", pp. 1-4.

Erway, C. Chris, et al., "Dynamic Provable Data Possession", Nov. 29, 2009, pp. 1-22, Brown University, Providence, RI.

International Search Report and Written Opinion, Application No. PCT/IB2018/000855, dated Oct. 9, 2018.

International Search Report and Written Opinion, International Application No. PCT/IB2017/000632, dated Jul. 28, 2017.

Micali, Silvio, et al., "Zero-Knowledge Sets", Laboratory for Comp. Sci, MIT, Cambridge, MA 02138: Dept. of Applied Sci, Harvard, Univ., Cambridge, MA 02138, Research at Harvard Univ. by NSF Grant ITR 0205423; NEC Laboratories, America joe@nec-labs.com; 12 pages.

Robles, Klara, "The Path to Self-Sovereign Identity", WebOfTrustInfo / ID2020designWorkshop, Apr. 26, 2016, 7 pages.

Scott, Michael, "M-Pin: A Multi-Factor Zero Knowledge Authentication Protocol," Chief Cryptographer, Certivox Labs, mike.scott@certivox.com; pp. 1-12.

Smith, Samuel M., et al., "Identity System Essentials", Evernym, Mar. 29, 2016, 16 pages.

Snow, Paul, et al., "Factom: Business Processes Secured by Immutable Audit Trails on the Blockchain", www.Factom.org; Ver. 1.0, Nov. 17, 2014, pp. 1-38.

Tobin, Andrew, et al., "White Paper—The Inevitable Rise of Self-Sovereign Identity", Sorvin, Identity for all, Sorvin Foundation, sorvin.org; Sep. 29, 2016, pp. 1-23.

Vaughan, Wayne, et al., "Chainpoint—A scalable protocol for recording data in the blockchain and generating blockchain receipts", V. 1.0, Jul. 22, 2015, 6 pages.

Wilkinson, Shawn, et al., "Storj: A Peer-to-Peer Cloud Storage Network", V. 1.01, Dec. 15, 2014, pp. 1-18.

Zyskind, Guy, et al., "Decentralizing Privacy: Using Blockchain to Protect Personal Data," The Institute of Electrical and Electronics Engineers, Inc. (IEEE) Conference Proceedings, (May 1, 2015) p. 180, XP055360065.

International Search Report & Written Opinion, Application No. PCT/IB2018/001533, dated Apr. 29, 2019.

* cited by examiner

METHOD AND SYSTEM FOR DATA SECURITY, VALIDATION, VERIFICATION AND PROVENANCE WITHIN INDEPENDENT COMPUTER SYSTEMS AND DIGITAL NETWORKS

CROSS REFERENCE TO RELATED APPLICATIONS

This application is a non-provisional of, and claims priority to, U.S. Provisional Application Ser. No. 62/595,416, filed Dec. 6, 2017, and is related to commonly-assigned, co-pending application Ser. No. 15/480,313, filed Apr. 5, 2017, which claims priority to Application Ser. No. 62/318,648, filed on Apr. 5, 2016, and commonly-assigned, co-pending application Ser. No. 16/031,433, filed Jul. 10, 2018, which claims priority to Application Ser. No. 62/530,755, filed on Jul. 10, 2017, and which applications are hereby incorporated by reference in their entirety and for all purposes.

FIELD

The present disclosure relates to data security, and more specifically, but not exclusively, to a system and method for data security, validation, verification, and provenance within independent computer systems and digital networks.

BACKGROUND

Traditional and generally accepted security measures and common security infrastructure—such as passwords, key management software, and two-factor authentication approaches—have failed to deliver reliable and secure protection of both the infrastructures they are meant to protect, as well as the individual user's personal data.

The increased number of hacks, attacks, security breaches, successful fraud attempts, and stolen passwords from end-users—and even entire databases from private companies as well as public/government organizations—have led to declining trust from users regarding organizations that provision their credentials and integrity of the personal data that is used to provide user access. Generally, data compromise generates a lack of confidence in trusting personal identifiable information to anyone. This increased user fear and concern for individual data privacy, as well as personal data safety held by third parties, have led to increased technical challenges for organizations to maintain and protect the personal identifiable information of their users. For example, conventional methods typically require increased resources to improve data center monitoring and security—including firewalls, secure environments, data breach detection, penetration testing, resilience exercises against potential hacks and security breaches.

The main reason for the lack of security in conventional systems is that outdated concepts and poor fundamental design is commonly used in technologies and practices aimed at establishing and protecting identity as well as existing (or a potential user's) personal details. Most organizations using these outdated technologies are forced to store any personal data collected centrally and store the personal data "as is"—unencrypted. Even when it's encrypted, such data currently can be stolen and used elsewhere for nefarious purposes, due to the single point of compromise in the conventional approaches.

While there are many faults within conventional personal identity management systems, some examples include: storing data in its initial or apparent form; storing data in open form or un-encrypted; storing data in encrypted form that can easily be restored to their initial or open form; storing of passwords including digital keys; existence of backdoors; not decentralized, "all eggs in one basket" storage; having a single point of compromise; and conceptually offering any form of "trusted authorities."

In view of the foregoing, a need exists for an improved system for data management in an effort to overcome the aforementioned obstacles and deficiencies of conventional data collection, storage, query, and management systems.

Figure 1:
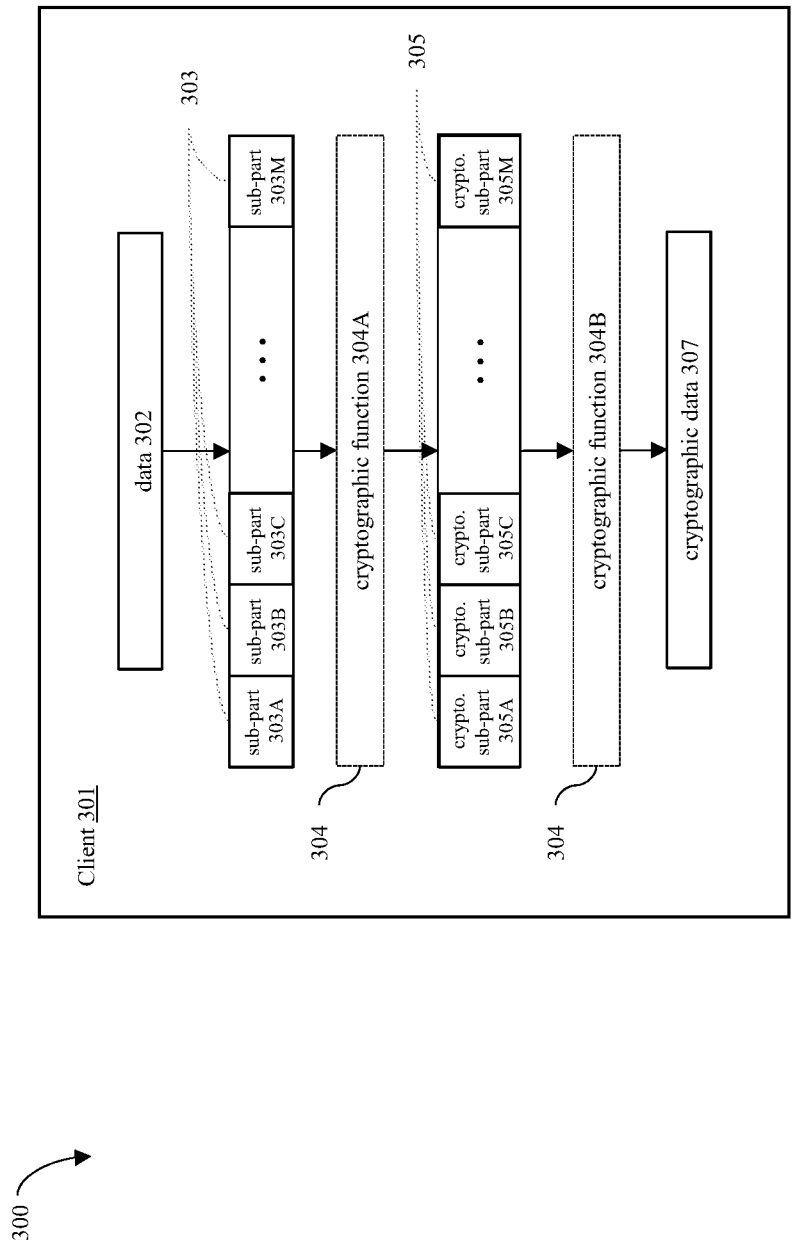
FIG. 1 is an exemplary top-level block diagram illustrating one embodiment of a data management system including a client device for partitioning data and generating cryptographic data.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since currently-available personal identity management systems are deficient because of outdated data storage and data management techniques, a system for data management including recording, storing, verifying, authenticating and authorizing of cryptographic data and its attributes can prove desirable and provide a basis for a wide range of data management applications, such as for digital identity access to international travel, telecommunication services, financial services, banking, credit, insurance, medical records, and to prevent fraud or misuse of identity information. This result can be achieved, according to one embodiment disclosed herein, by a data management system 300 as illustrated in FIG. 1.

Turning to FIG. 1, the data management system 300 is shown as including a client 301. In a preferred embodiment, the client 301 receives data 302 in its original, unencrypted form. In other embodiments, the data 302 includes data that has been subjected to cryptographic functions such as cryptographic primitives including, but not limited to hash functions, digital signature schemes and encryption functions. The data 302 can be of any nature, form, and complexity. The data 302 is shown as comprising data sub-parts 303A-M. It should be understood that there can be any number of data sub-parts 303 comprising the data 302. By way of another example, the data 302 can include a single sub-part 303 (not shown), thereby representing the full data set of the data 302, or up to sub-part 303M, thereby including M sub-portions 303 of the data 302. In yet another embodiment, a selected sub-part 303 can overlap with the data represented and/or contained by another sub-part 303. In other words, the same portion of data can be maintained in two or more separate sub-parts 303. Similarly, the sub-parts 303 can also include only data that is unique from each other. In an even further embodiment, a selected sub-part 303 can include other data that is not directly received as the data 302 (e.g., metadata for a selected sub-part 303).

The client 301 provides the data sub-parts 303 to a cryptographic function 304 (e.g., such as a cryptographic function 304A shown in FIG. 1). The cryptographic function 304 can include a cryptographic primitive such as, but not limited to, a hash function, a digital signature scheme, a blinding/unblinding technique, and/or an encryption function in order to generate one or more cryptographic sub-parts 305. In some embodiments, the cryptographic function 304 can include any combination of cryptographic primitives to generate the cryptographic sub-parts 305. In a preferred embodiment, the cryptographic function 304 comprises a hash function (e.g., SHA-1, SHA-2, SHA-3 or script). In an even further embodiment, the number of resulting cryptographic sub-parts 305 can be different from the number of data sub-parts 303. In yet another embodiment (not shown), the data 302 can be provided to the cryptographic function 304A without the need for the data sub-parts 303.

The client 301 then provides the cryptographic sub-parts 305 to a second cryptographic function 304B to generate cryptographic data 307. In some embodiments, the second cryptographic function 304B can include any combination of cryptographic primitives to generate the cryptographic data 307. In a preferred embodiment, the second cryptographic function 304B comprises a hash function (e.g., SHA-1, SHA-2, SHA-3 or script). In some embodiments, the second cryptographic function 304B can be the same as the cryptographic function 304A. In yet another embodiment, the data 302 can be directly provided to the second cryptographic function 304B to generate the cryptographic data 307. In some embodiments, a tree structure (e.g., a Merkle Tree or other similar structure) can be derived from the set of cryptographic sub-parts 305 before applying the second cryptographic function 304B to the tree root.

Figure 2:
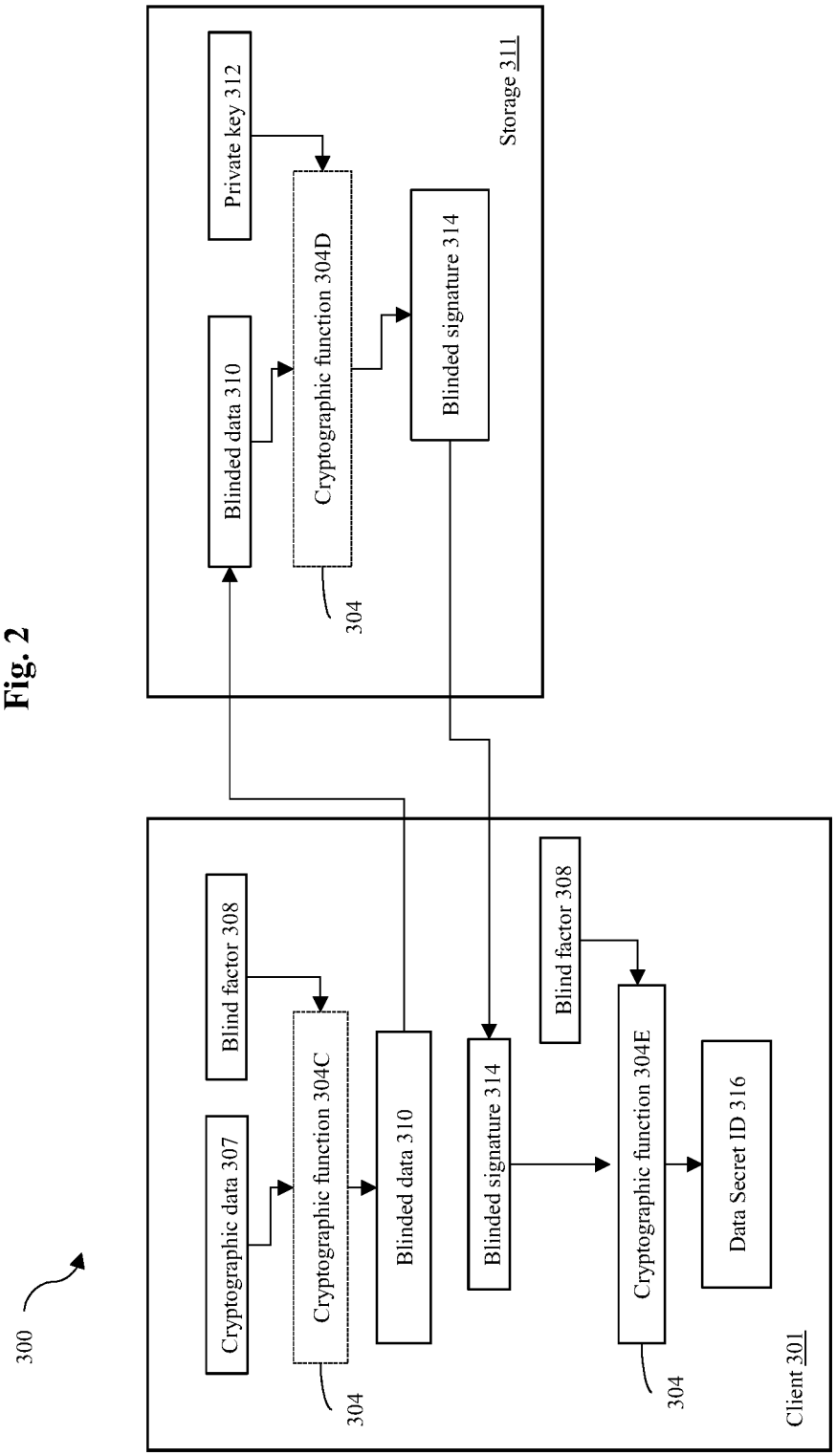
FIG. 2 is an exemplary top-level block diagram illustrating one embodiment of a data flow for generating a Data Secret ID using the data management system of FIG. 1.

In a preferred embodiment, the client 301 provides the cryptographic data 307 and a blind factor 308 to a third cryptographic function 304C to generate blinded data 310, as shown on FIG. 2. The blind factor 308 can represent a random value. In some embodiments, a public key (not shown) of a storage 311 can be used as an additional input to the third cryptographic function 304C. In some other embodiments, the blind factor 308 is optional. In some other embodiments, the blinded data 310 can be the same as the cryptographic data 307. In some embodiments, the third cryptographic function 304C can include any combination of one or more cryptographic primitives to generate the blinded data 310. In some embodiments, the third cryptographic function 304C can be the same as the cryptographic function 304A and/or the second cryptographic function 304B. In a preferred embodiment, the third cryptographic function 304C includes a Verifiable Random Function, such as, but not limited to, RSA-FDH-VRF for blinding.

The blinded data 310 is then sent to the storage 311 as shown on FIG. 2. In some embodiments, the storage 311 can reside on, or include components of, the client 301. The data management system 300 is suitable for use with any type of storage 311, such as a decentralized distributed storage, including, but not limited to, for example, a distributed hash table, a distributed database, a peer-to-peer hypermedia distributed storage (e.g., InterPlanetary File System (IPFS)), a distributed ledger (e.g., Blockchain), an operating memory, a centralized database, a cloud-based storage, and/or the like. In other embodiments, the storage 311 is not decentralized or comprises a combination of distributed, decentralized servers, and centralized servers. In even further embodiments, the storage 311 can be maintained in operating memory of any component in the system 300.

FIG. 2 shows the storage 311 providing the blinded data 310 and a private key 312 to a fourth cryptographic function 304D for producing a blinded signature 314. In a preferred embodiment, the private key 312 is a (large) private cryptographic secret key. In some embodiments, the fourth cryptographic function 304D can include any combination of one or more cryptographic primitives to generate the blinded signature 314. In some embodiments, the fourth cryptographic function 304D includes a deterministic encryption/signature scheme. In even further embodiments, the blinded signature 314 can be the same as the blinded data 310. In a preferred embodiment, the fourth cryptographic function 304D comprises a Verifiable Random Function, such as, but not limited to, RSA-FDH-VRF, for generating the blinded signature 314. In yet another embodiment, the fourth cryptographic function 304D can be the same as the third cryptographic function 304C.

The blinded signature 314 can be returned to the client 301 as shown on FIG. 2. The client 301 can provide the blinded signature 314 and the blind factor 308 to a fifth cryptographic function 304E to generate a Data Secret ID 316. In some embodiments, a public key (not shown) of the storage 311 can be also used as an additional input for the fifth cryptographic function 304E. In some embodiments, the fifth cryptographic function 304E includes any combination of one or more cryptographic primitives to generate the Data Secret ID 316. In yet another embodiment, the Data Secret ID 316 can be the same as the blinded signature 314. In a preferred embodiment, the fifth cryptographic function 304E includes a Verifiable Random Function (e.g., RSA-FDH-VRF) for unblinding the blinded signature 314. In some embodiments, unblinding includes shifting/unshifting a digital signature by a blinding factor to recover the original signature from the shifted signature. Thereby, the Data Secret ID 316 is mathematically binded with the cryptographic data 307. In further embodiments, the fifth cryptographic function 304E can be the same as the fourth cryptographic function 304D and/or the third cryptographic function 304C.

In some embodiments, the Data Secret ID 316 can be the same as the cryptographic data 307—this is helpful in the case when the data 302 has a high combinatorial entropy preventing the possibility of brute-forcing the original data 302 comprised by the cryptographic data 307. In some other embodiments, the storage 311 may not be involved in the process of generating the Data Secret ID 316. However, in a preferred embodiment, due to the fact that the client 301 blinds the cryptographic data 307 before sending it to the storage 311, the storage 311 is never being in a possession of the original data 302 and the cryptographic data 307. Accordingly, the client 301 advantageously protects the original data 302 and the cryptographic data 307 to prevent brute-force or reverse engineer attacks on the blinded data 310 alone. Advantageously, in the preferred embodiment, it is not possible for the storage 311 to tamper with the Data Secret ID 316—by the methods disclosed herein of the data management system 300, the Data Secret ID 316 can be subjected to the verification and validation processes on a client 301 side which would flag any data tampering. The data management system 300 advantageously prevents brute-force attacks of the Data Secret ID 316 from the original data 302 on the client 301 by forcing the client 301 to send blinded data 310 to the storage 311 where it is then subject to the fourth cryptographic function 304D with the private key 312 known only to the storage 311. Without knowledge of the private key 312, it is computationally inefficient to brute-force the Data Secret ID 316 on the client 301.

Figure 3:
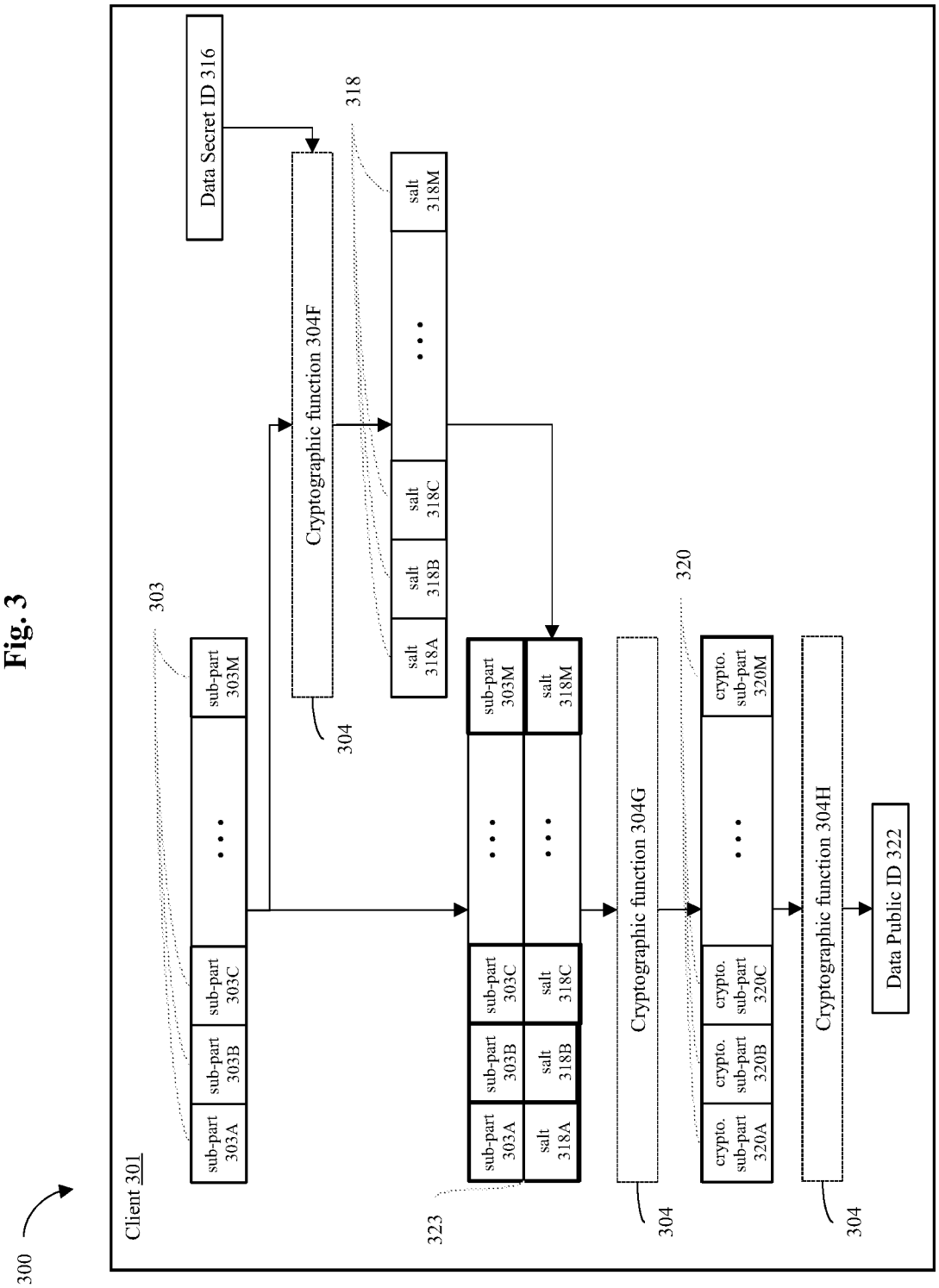
FIG. 3 is an exemplary top-level block diagram illustrating an embodiment of a data flow for generating a Data Public ID using the data management system of FIG. 1.

Turning to FIG. 3, the client 301 provides the data sub-parts 303 and the Data Secret ID 316 to a sixth cryptographic function 304F in order to generate a set of salts 318. In some embodiments, the number of salts 318 can be different from the number of data sub-parts 303. In some embodiments, the sixth cryptographic function 304F includes one or more cryptographic primitives to generate the salts 318. In a preferred embodiment, the sixth cryptographic function 304F includes a hash function, such as but not limited to SHA-1, SHA-2, SHA-3, or script. In other embodiments, the sixth cryptographic function 304F can be the same as the cryptographic functions 304E, 304D, 304C, 304B, and/or 304A.

The client 301 combines correlated data sub-parts 303A-M and salts 318A-M together and provides the resulting dataset 323 to a seventh cryptographic function 304G to generate a set of salted cryptographic sub-parts 320A-M. In some embodiments, the seventh cryptographic function 304G includes any combination of one or more cryptographic primitives to generate the set of salted cryptographic sub-parts 320. In yet another embodiment, the Data Public ID 322 can be the same as the Data Secret ID 316. In a preferred embodiment, the seventh cryptographic function 304G includes a hash function, such as but not limited to SHA-1, SHA-2, SHA-3, or script for hashing each part of the resulting dataset 323.

The client 301 provides the salted cryptographic sub-parts 320 to an eighth cryptographic function 304H to generate a Data Public ID 322 as shown on FIG. 3. In some embodiments, the eighth cryptographic function 304H includes any combination of one or more cryptographic primitives to generate the Data Public ID 322. In some embodiments, Data Public ID 322 can be the same as the cryptographic data 307 and/or the Data Secret ID 316. In a preferred embodiment, the eighth cryptographic function 304H includes a hash function, such as but not limited to SHA-1, SHA-2, SHA-3, or script. In some embodiments, the eighth cryptographic function 304H can be the same as the seventh cryptographic function 304G.

Advantageously, the data management system 300 prevents a brute-force attack of the all possible combinations that can be used as the Data Public ID 322 for all possible data 302 and/or the cryptographic data 307 that resides on the client 301. Accordingly, it is difficult for anyone to receive or steal any meaningful data in its original easily accessible form, even for the data 302 that has a low combinatorial entropy. In some embodiments, the Data Public ID 322 can be used publicly (e.g., published) without the fear of a brute-force or reverse-engineered attack.

Figure 4:
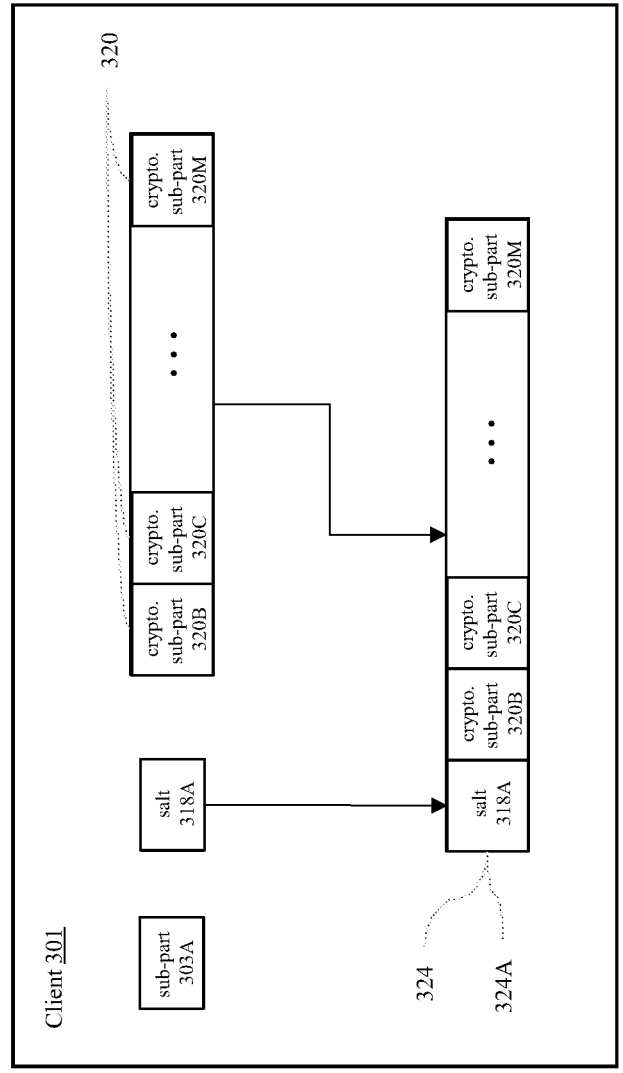
FIG. 4 is an exemplary top-level block diagram illustrating an embodiment of a data flow for generating a Proof of Inclusion using the data management system of FIG. 1.

For each given data sub-part 303, the client 301 can generate a proof of inclusion 324, such as shown in FIG. 4. Although FIG. 4 illustrates a single proof of inclusion 324A generated for the selected sub-part 303A, it should be understood that the same process can be applied for any of the data sub-parts 303B-M to generate corresponding proofs of inclusion 324B-M. The proof of inclusion 324A for the sub-part 303A includes the salt 318A and the cryptographic sub-parts 320B-M.

Figure 5:
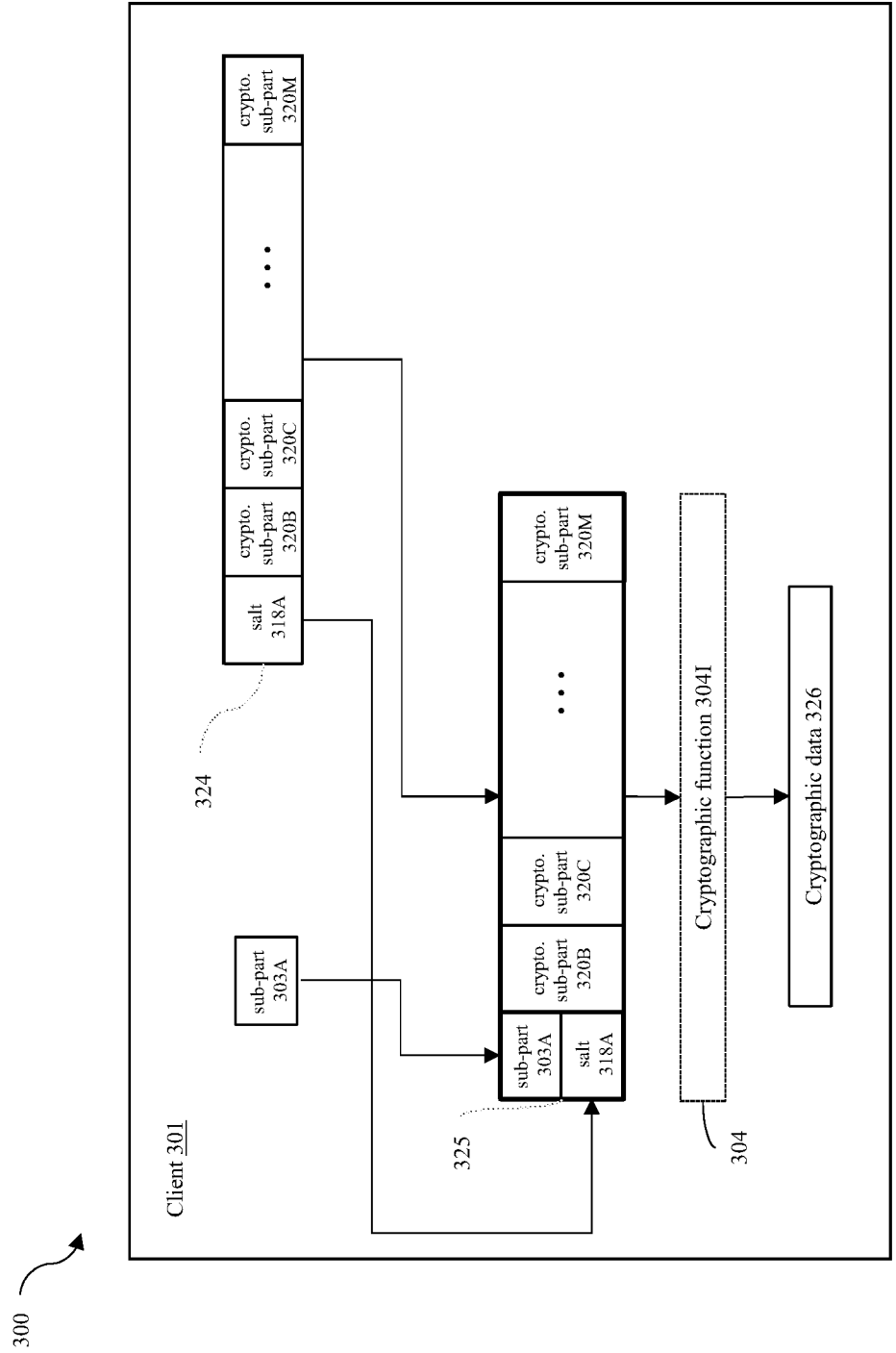
FIG. 5 is an exemplary top-level block diagram illustrating an embodiment of a data flow for validating a Proof of Inclusion using the data management system of FIG. 1.

Advantageously, the proof of inclusion 324 for the selected sub-part 303 can be used to mathematically prove that the selected sub-part 303 is indeed a part of the Data Public ID 322 as shown in FIG. 5. Turning to FIG. 5, the data sub-part 303A is combined with the salt 318A. The resulting combination is combined with the remaining part of the proof of inclusion 324 and form a dataset 325. The client 301 then provides the dataset 325 to a ninth cryptographic function 304I to generate the cryptographic data 326. Only if the cryptographic data 326 equals to the Data Public ID 322, then the proof of inclusion 324 is valid, correct, and proves that the data sub-part 303A is the part of the original data 302 having the Data Public ID 322. In some embodiments, the top-level organization shown in FIG. 5 can be implemented on the storage 311.

Figure 6:
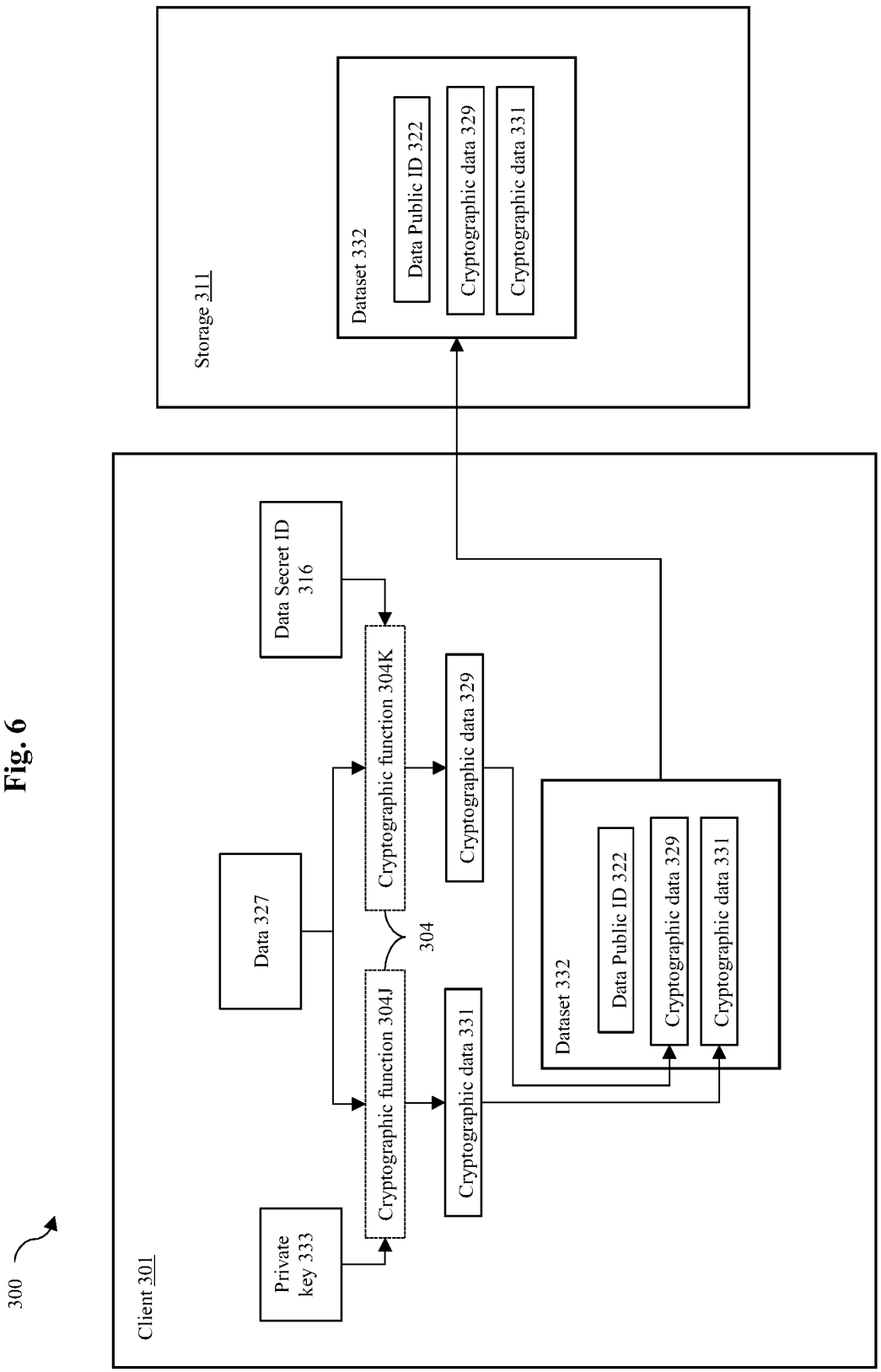
FIG. 6 is an exemplary top-level block diagram illustrating an embodiment of a data flow for data storage using the data management system of FIG. 1.

FIG. 6 illustrates a top-level flow diagram of transmission of a dataset 332 to the storage 311 using the Data Public ID 322 as an identifier. In a preferred embodiment, the client 301 receives the data 327 in its original, unencrypted form. In other embodiments, the data 327 includes data that has been subjected to cryptographic functions such as cryptographic primitives disclosed herein. The data 327 can be of any nature, form, and complexity. In some embodiments, the data 327 can be the same as the original data 302. In some embodiments, the data 327 can be the same as one or many of the data sub-parts 303.

The client 301 provides the data 327 and a private key 333 to a tenth cryptographic function 304J (e.g., a cryptographic primitive) to generate cryptographic data 331. In a preferred embodiment, the private key 333 is a (large) private cryptographic secret key known only to the client 301. In some embodiments, the private key 333 need not be used. In a preferred embodiment, the tenth cryptographic function 304J includes a FIPS-186-3 (or its analogues) to produce a digital signature (e.g., the cryptographic data 331) for the data 327. In other embodiments, different digital signatures schemes and approaches are used.

The client 301 also provides the data 327 and the Data Secret ID 316 to an eleventh cryptographic function 304K to generate cryptographic data 329. In some embodiments, the eleventh cryptographic function 304K includes one or more cryptographic primitives to generate the cryptographic data 329. In a preferred embodiment, the eleventh cryptographic function 304K includes an encryption scheme, such as, but not limited to, Advanced Encryption Standard (AES), Pretty Good Privacy (PGP), Rivest-Shamir-Adleman (RSA), Data Encryption Standard (DES), Blowfish cipher, Twofish cipher, and other similar encryptions schemes.

As shown in FIG. 6, the client 301 forms the dataset 332 with the Data Public ID 322 as an identifier, the cryptographic data 329, and the cryptographic data 331. In some embodiments, more data can be presented within the dataset 332 (e.g., meta-data can be included). The dataset 332 can be sent to the storage 311. In some embodiments, proofs of inclusion 324 of at least one sub-part 303 can be sent by the client 301 with the dataset 332 to the storage 311.

Figure 7:
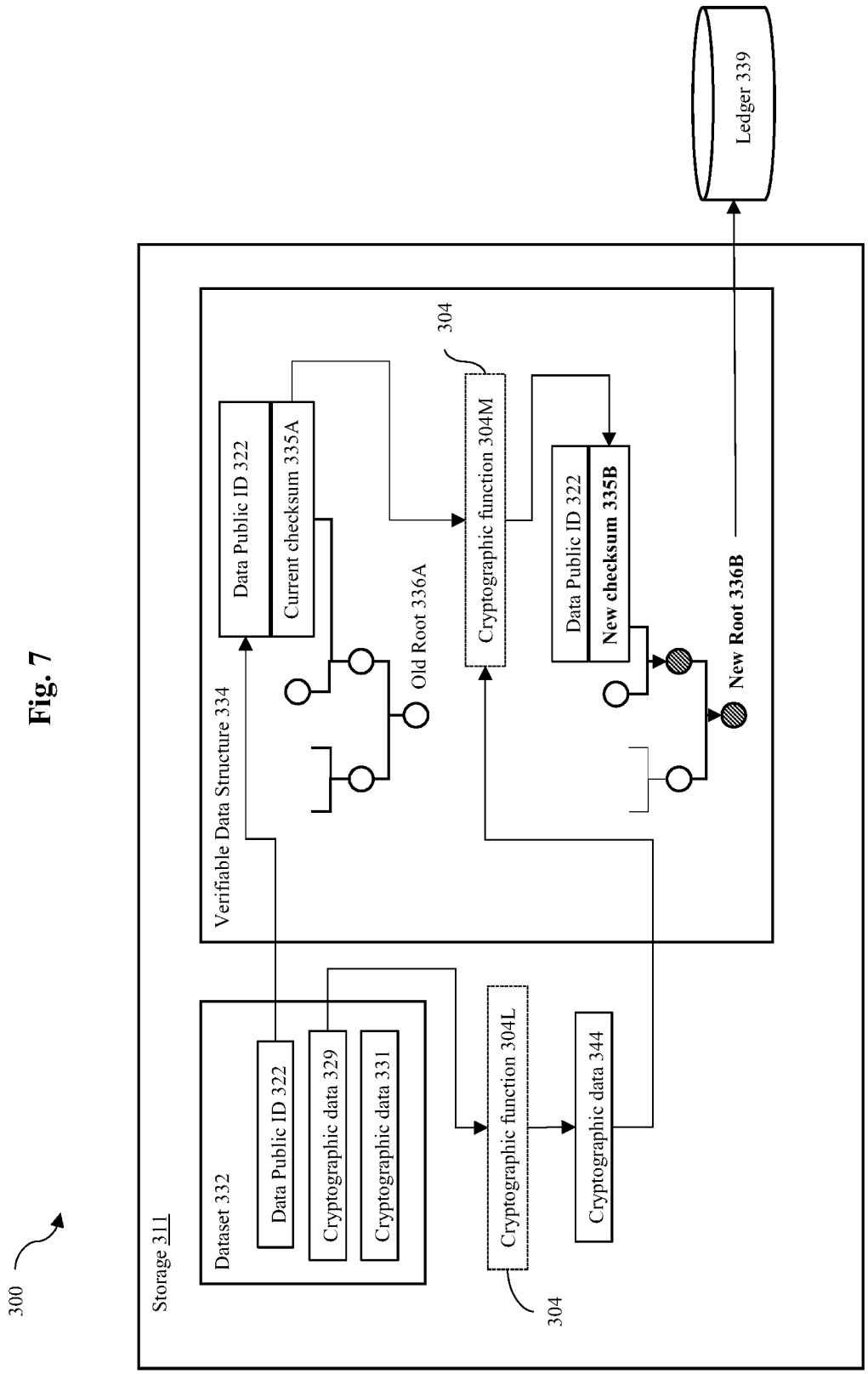
FIG. 7 is an exemplary top-level block diagram illustrating an embodiment of a Verifiable Data Structure that can be used by the data management system of FIG. 1 for altering and verifying cryptographic data.

Turning to FIG. 7, the storage 311 is shown as including a Verifiable Data Structure 334. In a preferred embodiment, a Sparse Merkle Tree is used as the Verifiable Data Structure 334. Using the Data Public ID 322, the storage 311 can uniquely identify a current checksum 335A stored within the Verifiable Data Structure 334 against the corresponding Data Public ID 322. The storage 311 then provides the cryptographic data 329 to a twelfth cryptographic function 304L (e.g., a cryptographic primitive) to produce cryptographic data 344. In some embodiments, the storage 311 verifies the cryptographic data 331 by checking the cryptographic data 331 against a public key (not shown) of the client 301 paired with the private key 333.

The client 301 then provides the current checksum 335A and the cryptographic data 344 to a thirteenth cryptographic function 304M to produce a new checksum 335B. In some embodiments, the thirteenth cryptographic function 304M includes one or more cryptographic primitives to generate the new checksum 335B. In a preferred embodiment, the thirteenth cryptographic function 304M includes hashing, such as, but not limited to, SHA-1, SHA-2, SHA-3, or script.

As shown in FIG. 7, a new tree root 336B is computed. In a preferred embodiment, the client 301 sequentially computes the new tree root 336B. In some embodiments, the data management system 300 also encodes data about each change onto a distributed ledger, such as a ledger 339 shown in FIG. 7. The data management system 300 is suitable for use with a wide range of ledgers 339, such as any immutable distributed ledger, including, for example, a public Blockchain (e.g., Bitcoin® Blockchain, Ethereum® Blockchain, etc.) and/or a private Blockchain and/or the like. In some embodiments, the storage 311 can be the same as the ledger 339. In some embodiments, the ledger 339 comprises a combination of public and/or private Blockchains. In some embodiments, the data management system 300 provides the safety and integrity for multiple amounts of records and events within the system 300, all within the parameters of a single ledger transaction on the ledger 339. In some other embodiments, each transaction corresponds to a single event within the storage 311. In alternative embodiments, each transaction represents a set of events or records within the storage 311. Each new record (or combination of records) of a transaction within the storage 311 generates a ledger transaction (not shown) into the ledger 339 as shown on FIG. 7, which allows anyone to verify and validate the existence and accuracy of this data entry.

For example, when the ledger 339 represents a Bitcoin® Blockchain, the ledger transaction represents a Bitcoin® Blockchain transaction and the new tree root 336B is written into an 'OP RETURN' field of the ledger transaction. The ledger transaction can be broadcasted over a ledger 339 network. As soon as a new block (reflecting the transaction) is created on the ledger 339, the record(s) which the data managemnt system 300 has placed within the ledger transaction is secured inside the ledger 339 itself. Stated in another way, once the ledger transaction is in the block, it is difficult to revert or tamper it, so it is difficult to change its history. In other embodiments, the ledger 339 executes smart contracts (e.g., Ethereum® Blockchain, Hyperledger® Fabric or Hyperledger® Indy). The smart contract is a computer protocol intended to digitally facilitate, verify, or enforce the negotiation or performance of a contract. The smart contracts allow the performance of credible transactions without third parties. These transactions are trackable and irreversible. These ledger transaction comprising the new tree root 336B (raw or hashed) within the body (contents) of the ledger transaction is distributed over the ledger 339 network, replayed on every Blockchain node and represents a global state change of the ledger 339. In yet another one embodiment, only some of the sequential new tree roots 336 are being published to the ledger 339.

In some embodiments, a combination of the cryptographic data 329 and the cryptographic data 331 can be saved within the storage 311 with the associated Data Public ID 322. This information is readable for the client 301 only if the client 301 is in possession of the original data 302 due to the fact that the Data Secret ID 316 is used as a decryption key for the cryptographic data 329. The storage 311 cannot reconstruct either the Data Secret ID 316 or original data 302, thereby providing full privacy for the client 301. In a preferred embodiment, the data management system 300 is suitable to store more than one value/record associated with the Data Public ID 322 cryptographic data 329 and/or cryptographic data 331.

Figure 8:
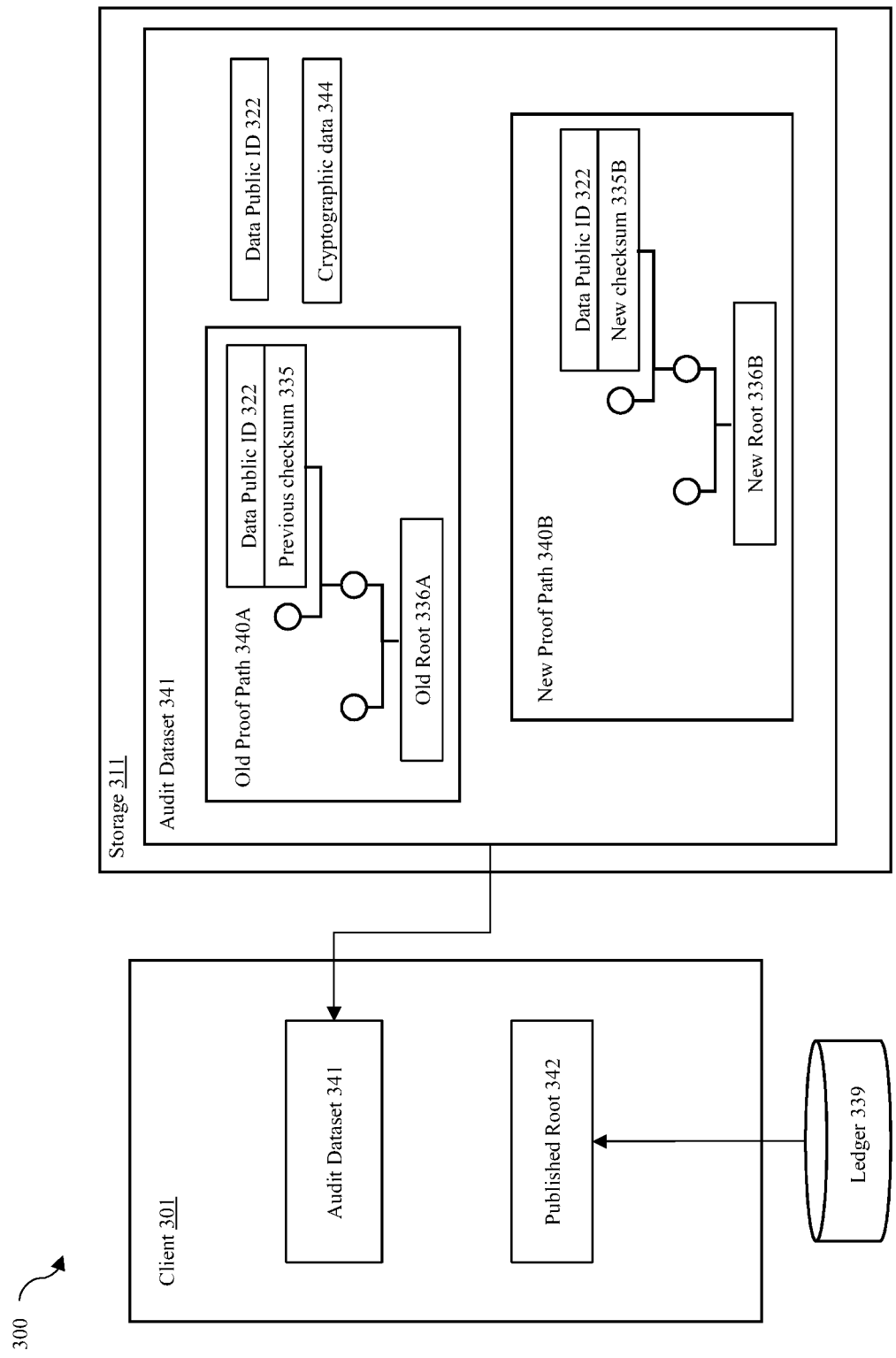
FIG. 8 is an exemplary top-level block diagram illustrating an embodiment of an audit dataset that can be used by the data management system of FIG. 1.

Advantageously, the client 301 can perform the audit of any operation, performed by the storage 311. Any data tampering or unsanctioned data removal can be detected, such as shown on FIG. 8. Turning to FIG. 8, the client 301 receives an Audit Dataset 341 for the operation of interest from the storage 311. The Audit Dataset 341 includes at least an Old Proof Path 340A, a New Proof Path 340B, a corresponding Data Public ID 322, and the cryptographic data 344.

Figure 9:
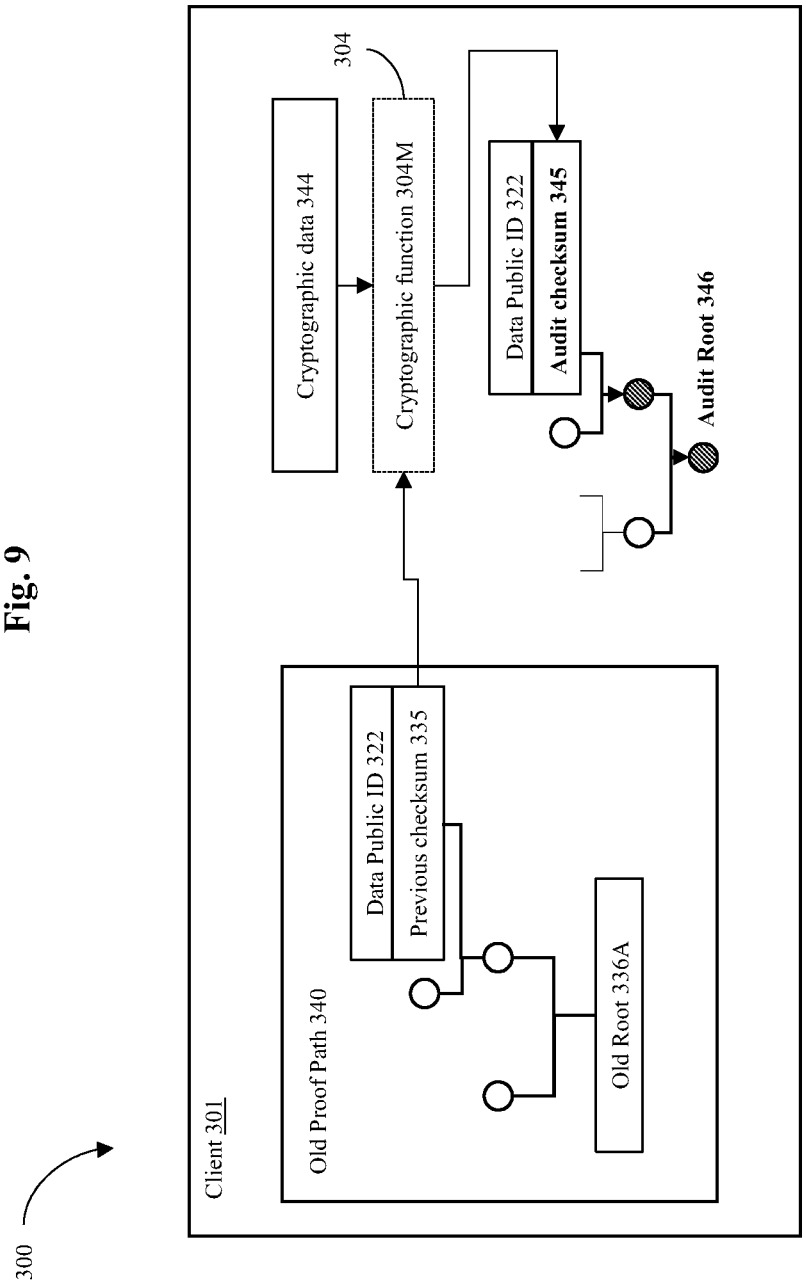
FIG. 9 is an exemplary top-level block diagram illustrating an embodiment of a data flow process for auditing that can be executed using the data management system of FIG. 1.

With reference now to FIG. 9, in order to validate, check and verify the operation being under audit, the client 301 provides the checksum 335 and Cryptographic data 344 received from the storage 311 to the thirteenth cryptographic function 304M to produce an Audit checksum 345. The client 301 changes the checksum 335 within the Old Proof Path 340A to the Audit checksum 345 and rebuilds the whole Verifiable Data Structure 334 up to the new Audit Root 346. An operation (or transaction) being audited is validated, checked and verified if the Audit checksum 345 equals the new checksum 335B, the Audit Root 346 equals the New Root 336B, and the Audit Root 346 and the New Root 336B respectively equals the Published Root 342.

Advantageously, the client 301 need not be in possession of the original data 302 to be able to validate each operation from the storage 311.

In a preferred embodiment, the client 301 performs the audit of each operation happening on the storage 311—each New Root 336B becomes trusted once audit is successfully completed.

Figure 10:
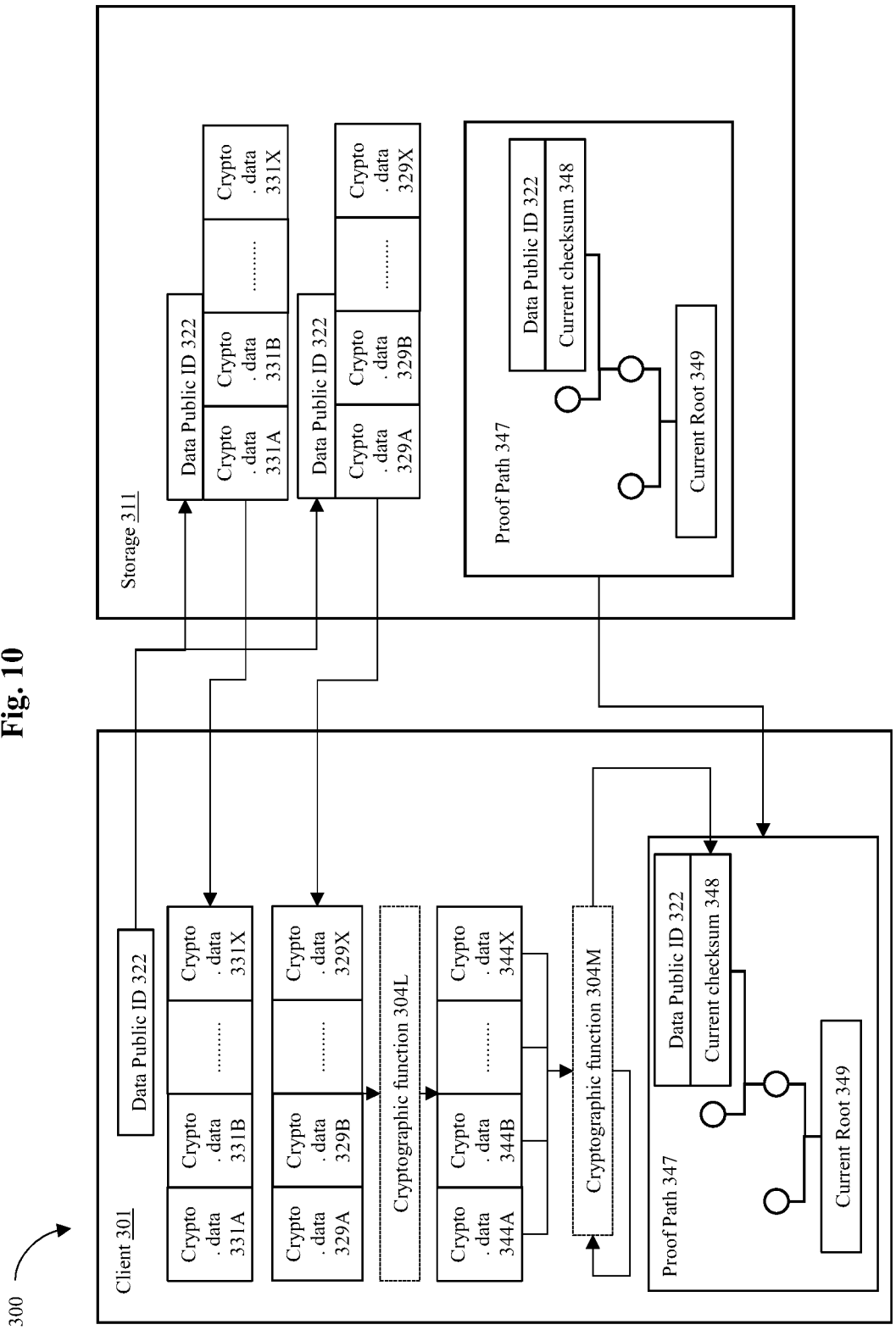
FIG. 10 is an exemplary top-level block diagram illustrating an embodiment of a data flow path for data retrieval and validation using the data management system of FIG. 1.

In order to get all of the data associated with the Data Public ID 322 from the storage 311, the client 301 sends Data Public ID 322 (known to him) to the storage 311 as shown on FIG. 10. The storage 311 locates all of the cryptographic data 329A-X and/or 322A-X associated with the Data Public ID 322 and sends them back to the client 301. Advantageously, the client 301 cannot read the original data 327 from the cryptographic data 329 without the knowledge of the Data Secret ID 316—the Data Secret ID 316 is used as a key to decrypt the cryptographic data 329. And conversely, the client 301 that is in possession of the Data Secret ID 316 can read the original data 327. Authenticity of the each of cryptographic data 329A-X can be checked by the client 301 through validating correlated cryptographic data 331A-X.

As an advantage, the client 301 can check that all of the cryptographic data sets 329 for the corresponding Data Public ID 322 were returned correctly and in full and that the storage 311 is not tampering with data or hiding some data. In order to do that, a client 301 provides received cryptographic data 329A-X to the twelfth cryptographic function 304L separately from each other in order to generate a set of the corresponding cryptographic data 344A-X. As shown on FIG. 10, the client 301 provides resulted cryptographic dataset 344A-X to the thirteenth cryptographic function 304M one by one, sequentially, providing the result back to the function input until all of the cryptographic data 344A-X were processed through the thirteenth cryptographic function 304M. Resulted data equals the Current checksum 348 if and only if the storage 311 has provided the client 301 with all of the stored cryptographic data 329 for the Data Public ID 322.

In some embodiments, the data management system can determine a proof of absence similar to a proof of inclusion described herein. For example, in a preferred embodiment, if no cryptographic data 329A-X (and/or 331) were ever stored within the storage 311 for a given Data Public ID 322, the storage 311 provides a mathematical proof of absence to client 301. Accordingly, the storage 311 generates a special Proof Path (not shown) comprising special a known empty value as the Current checksum 348. The empty value is known for every user of the data management system 300. The client 301 then validates the Proof Path described above—only authentic proofs of absence would pass this validation.

Advantageously, the methods and systems described herein provides a secure and private storage solution allowing the client 301 to store and get access to the original data 302 of any nature, form, and complexity. The Data Secret ID 316 can be generated only if the client 301 is already in a possession of the original data 302. Moreover, the Data Secret ID 316 and, accordingly, the Data Public ID 322 cannot be derived from the original data 302 on the client 301 without the storage 311 involvement in the process—it is a prevention of possible brute-force attack, especially for the original data 302 having a low entropy distribution (passport data, for instance).

At the same time, the privacy of the client 301 is preserved—the storage 311 receives only the blinded data 310, which, by itself, is not enough to restore the original data 302. Advantageously, the storage 311 cannot tamper with data identifiers 322 and 316 generation because the blinded signature 314 can be effectively checked, asserted, and validated on the client 301. The Data Public ID 322 advantageously can be shared, become public, and used as the public identifier for the original data 302—there is no efficient way to restore neither the original data 302 nor the Data Secret ID 316 out of the Data Public ID 322 alone.

The original data 302 partitioning and proofs of inclusion 324 generation process provides an efficient way to store, retrieve, manipulate and validate data sets 302 and 327 of any size and complexity due to the fact that a client 302 don't have to generate the cryptographic data sets 331 for each of the data 302 sub-parts 303. Moreover, data partitioning provides an advantage of partial data matching and provable search within the storage 311. This, in fact, provides an advantage of proving that the storage 311 indeed stores a sub-part 303 of the data 302 related to the Data Public ID 322 without the need to reveal any other information rather than the sub-part 303 of the data 302 that the client 301 is already in possession of and a related proof of inclusion 325, which by itself does not provide any useful additional information for an attacker.

The datasets 327 stored within the storage 311 can be accessed, read, and decrypted by the client 301 only if the client 301 is already in a possession of the original data 302 due to the fact that data 327 is encrypted using the Data Secret ID 316 that could be generated from the original form of data 302 only. The storage 311 has no efficient way to read stored datasets 327—data privacy of the client 302 is preserved as well.

The system 300 provides an advantage of the provable audit process described above, allowing the client 301 to ensure that the storage 311 does not tampering with the data 302 and/or the datasets 327 it stores and there is no altering or removal of the datasets 327 due to the process of using Verifiable Data Structures 334 and publishing its roots 336A, 336B to the append-only Ledger 339.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for managing secured data within independent computer systems and digital networks, the method comprising:

generating a cryptographic data stream by processing original data representing the secured data on a local client device through a first cryptographic function;

generating blinded data by providing the cryptographic data stream and a blind factor to a second cryptographic function;

generating a blinded signature by providing the generated blinded data and a private key to a third cryptographic function of a storage device, the private key accessible only to the storage device,
wherein the storage device comprises decentralized distributed storage;

generating a data secret identifier by providing the generated blinded signature and the blind factor to a fourth cryptographic function, wherein the generated data secret identifier is mathematically binded with the generated cryptographic data stream, and the storage device is never in possession of the original data and the generated cryptographic data stream;

partitioning the original data on the local client device into one or more original data sub-parts prior to said generating the cryptographic data stream;

generating one or more cryptographic data sub-parts by processing the partitioned original data sub-parts on the local client device through the first cryptographic function,
wherein said generating the cryptographic data stream comprises processing the generated cryptographic data sub-parts through the first cryptographic function;

generating a set of salts by processing the partitioned original data sub-parts and the generated data secret identifier through a fifth cryptographic function;

combining the set of salts and the partitioned original data sub-parts by associating a selected salt with its corresponding data sub-part;

generating a set of cryptographic salts by processing the combined set of salts and the partitioned original data sub-parts data through a sixth cryptographic function;

generating a data public identifier by processing the set of cryptographic salts through a seventh cryptographic function; and generating a proof of inclusion for each partitioned original data sub-part, a selected proof of inclusion for a selected partitioned original data sub-part includes its corresponding salt and the generated set of cryptographic salts, the selected proof of inclusion for mathematically establishing that the selected partitioned original data sub-part is included in the generated data public identifier.

2. The method of claim 1, further comprising deriving a tree structure from the generated cryptographic data sub-parts prior to said generating the cryptographic data stream.

3. The method of claim 1, further comprising mathematically establishing that the selected original data sub-part is included in the generated data public identifier by forming a dataset by combining the selected original data sub-part and the selected proof of inclusion; generating a proof cryptographic data by processing the dataset through an eighth cryptographic function; determining whether the proof cryptographic data equals the data public identifier.

4. The method of claim 1, further comprising providing the generated cryptographic data stream and the data public identifier to a verifiable data structure, the verifiable data structure comparing a current checksum with the data public identifier.

5. The method of claim 4, further comprising producing a new checksum by processing the current checksum and the generated cryptographic data stream to a twelfth cryptographic data stream.

6. The method of claim 1, wherein said generating blinded data comprises providing a random value as the blind factor.

7. The method of claim 1, wherein said generating blinded data further comprises providing a public key of the storage device to the second cryptographic function.

8. The method of claim 1, wherein said generating the cryptographic data stream comprises processing the original data through a hash function.

9. The method of claim 1, further comprising creating an associated ledger transaction in a distributed ledger comprising said generated blinded signature of the storage device.

10. A method for managing secured data within independent computer systems and digital networks, the method comprising:

generating a cryptographic data stream by processing original data representing the secured data on a local client device through a first cryptographic function;

generating blinded data by providing the cryptographic data stream to a second cryptographic function;

generating a blinded signature by providing the generated blinded data and a private key to a third cryptographic function of a storage device being different than the local client device, the private key accessible only to the storage device, wherein the storage device comprises decentralized distributed storage; and generating a data secret identifier by providing the generated blinded signature to a fourth cryptographic function, wherein the generated data secret identifier is mathematically binded with the generated cryptographic data stream;

partitioning the original data on the local client device into original data sub-parts prior to said generating the cryptographic data stream;

generating one or more cryptographic data sub-parts by processing the partitioned original data sub-parts on the local client device through the first cryptographic function, wherein said generating the cryptographic data stream comprises processing the generated cryptographic data sub-parts through the first cryptographic function;

generating a set of salts by processing the partitioned original data sub-parts and the generated data secret identifier through a fifth cryptographic function;

combining the set of salts and the partitioned original data sub-parts by associating a selected salt with its corresponding data sub-part;

generating a set of cryptographic salts by processing the combined set of salts and the partitioned original data sub-parts data through a sixth cryptographic function;

generating a data public identifier by processing the set of cryptographic salts through a seventh cryptographic function; and generating a proof of inclusion for each partitioned original data sub-part, a selected proof of inclusion for a selected partitioned original data sub-part includes its corresponding salt and the generated set of cryptographic salts, the selected proof of inclusion for mathematically establishing that the selected partitioned original data sub-part is included in the generated data public identifier.

11. A computer-implemented system for managing secured data within independent computer systems and digital networks, the method comprising:

a client device for generating a cryptographic data stream by processing original data representing the secured data through a first cryptographic function, generating blinded data by providing the cryptographic data stream and a blind factor to a second cryptographic function;

a verifiable storage device in communication with the client device for generating a blinded signature by processing the generated blinded data and a private key to a third cryptographic function, the private key accessible only to the verifiable storage device, wherein the verifiable storage device comprises decentralized distributed storage; and wherein the client device further generates a data secret identifier by providing the generated blinded signature and the blind factor to a fourth cryptographic function, wherein the generated data secret identifier is mathematically binded with the generated cryptographic data stream, and the verifiable storage device is never in possession of the original data and the generated cryptographic data stream, wherein the client device further partitions the original data into one or more original data sub-parts prior to said generating the cryptographic data stream, generates one or more cryptographic data sub-parts by processing the partitioned original data sub-parts through the first cryptographic function, wherein the client device generates the cryptographic data stream by processing the generated cryptographic data sub-parts through the first cryptographic function, wherein the client device further generates a data public identifier by generating a set of salts by processing the partitioned original data sub-parts and the generated data secret identifier through a fifth cryptographic function, combining the set of salts and the partitioned original data sub-parts by associating a selected salt with its corresponding data sub-part, generating a set of cryptographic salts by processing the combined set of salts and the partitioned original data sub-parts data through a sixth cryptographic function, and generating the data public identifier by processing the set of cryptographic salts through a seventh cryptographic function, and wherein the client device further generates a proof of inclusion for each partitioned original data sub-part, a selected proof of inclusion for a selected partitioned original data sub-part includes its corresponding salt and the generated set of cryptographic salts, the selected proof of inclusion for mathematically establishing that the selected partitioned original data sub-part is included in the generated data public identifier.

12. The computer-implemented system of claim 11, wherein said client device further derives a tree structure from the generated cryptographic data sub-parts prior to said generating the cryptographic data stream.

13. The computer-implemented system of claim 11, further comprising a distributed ledger in communication with the verifiable storage device for managing ledger transactions based on any transaction occurring in the verifiable storage device.

14. The computer-implemented system of claim 11, wherein the decentralized distributed storage comprises at least one of a distributed hash table, a distributed database, a peer-to-peer hypermedia distributed storage, a distributed ledger, an operating memory, a centralized database, or a cloud-based storage.

* * * * *